(12) United States Patent  
Kimoto

(10) Patent No.: US 10,897,065 B2  
(45) Date of Patent: Jan. 19, 2021

(54) ELECTRIFIED VEHICLE ARRAY PLATE THAT HOUSES AT LEAST ONE ELECTRONIC MODULE

(71) Applicant: FORD GLOBAL TECHNOLOGIES, LLC, Dearborn, MI (US)

(72) Inventor: Masahiro Kimoto, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 769 days.

(21) Appl. No.: 14/685,936

(22) Filed: Apr. 14, 2015

(65) Prior Publication Data

US 2016/0309617 A1    Oct. 20, 2016

(51) Int. Cl.

| | | |
|---|---|---|
| *H01M 10/42* | (2006.01) | |
| *B60L 3/00* | (2019.01) | |
| *B60L 15/20* | (2006.01) | |
| *H01M 10/6556* | (2014.01) | |
| *B60L 3/12* | (2006.01) | |
| *H01M 10/613* | (2014.01) | |
| *H01M 10/625* | (2014.01) | |
| *H01M 2/10* | (2006.01) | |
| *B60L 50/64* | (2019.01) | |

(Continued)

(52) U.S. Cl.

CPC ....... *H01M 10/4257* (2013.01); *B60L 3/0046* (2013.01); *B60L 3/12* (2013.01); *B60L 15/20* (2013.01); *B60L 15/2054* (2013.01); *B60L 50/16* (2019.02); *B60L 50/61* (2019.02); *B60L 50/64* (2019.02); *B60L 58/21* (2019.02); *B60L 58/26* (2019.02); *H01M 2/1077* (2013.01); *H01M 10/613* (2015.04); *H01M 10/625* (2015.04); *H01M 10/6556* (2015.04); *B60L 2240/12* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60L 2240/547* (2013.01); *B60L 2240/549* (2013.01); *H01M 2220/20* (2013.01); *Y02T 10/62* (2013.01); *Y02T 10/64* (2013.01); *Y02T 10/70* (2013.01); *Y02T 10/7072* (2013.01); *Y02T 10/72* (2013.01)

(58) Field of Classification Search  
None  
See application file for complete search history.

(56) References Cited

U.S. PATENT DOCUMENTS

| | | | |
|---|---|---|---|
| 8,968,912 B2 | 3/2015 | Maguire et al. | |
| 9,537,128 B2 * | 1/2017 | Sekine | H01M 2/1077 |

(Continued)

FOREIGN PATENT DOCUMENTS

| | | |
|---|---|---|
| CN | 103770611 | 5/2014 |
| CN | 104285336 | 1/2015 |

(Continued)

OTHER PUBLICATIONS

Translation of CN103770611 (Year: 2014).*

*Primary Examiner* — Lucas J. O'Donnell  
(74) *Attorney, Agent, or Firm* — David Kelley, Esq.; Carlson, Gaskey & Olds, P.C.

(57) ABSTRACT

An exemplary assembly includes an array plate, and an electronic component held within a cavity of the array plate. An exemplary method includes housing an electronic component within a cavity of an array plate, and holding a battery cell of an array with the array plate.

17 Claims, 3 Drawing Sheets

(51) Int. Cl.
*B60L 50/16* (2019.01)
*B60L 58/21* (2019.01)
*B60L 58/26* (2019.01)
*B60L 50/61* (2019.01)

(56) References Cited

U.S. PATENT DOCUMENTS

| | | | | |
|---|---|---|---|---|
| 2011/0206948 A1* | 8/2011 | Asai | ............... | H01M 2/0473 |
| | | | | 429/7 |
| 2011/0212348 A1* | 9/2011 | Yasui | ............... | H01M 2/12 |
| | | | | 429/7 |
| 2011/0300424 A1* | 12/2011 | Kim | ............... | H01M 2/30 |
| | | | | 429/99 |
| 2014/0141287 A1* | 5/2014 | Bertucci | ............... | H01M 10/425 |
| | | | | 429/7 |
| 2015/0171482 A1* | 6/2015 | Lee | ............... | H01M 2/34 |
| | | | | 429/121 |
| 2016/0093857 A1* | 3/2016 | Dekeuster | ............... | H01M 2/1241 |
| | | | | 429/56 |
| 2016/0104873 A1* | 4/2016 | Smythe | ............... | H01M 2/202 |
| | | | | 429/56 |

FOREIGN PATENT DOCUMENTS

| | | |
|---|---|---|
| JP | 3702149 | 10/2005 |
| JP | 2011175743 | 9/2011 |
| JP | 2013246941 | 12/2013 |
| WO | 2012042913 | 4/2012 |

* cited by examiner

ELECTRIFIED VEHICLE ARRAY PLATE THAT HOUSES AT LEAST ONE ELECTRONIC MODULE

TECHNICAL FIELD

This disclosure relates to an array plate within a battery pack of electrified vehicles and, more particularly, to housing electronic modules within a cavity of the array plate.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Electrified vehicles can include various electronic modules. Some of the electronic modules are associated with operation the battery packs of electrified vehicles. Many electronic modules generate thermal energy during operation.

SUMMARY

An assembly according to an exemplary aspect of the present disclosure includes, among other things, an array plate, and an electronic component held within a cavity of the array plate.

In another example of the foregoing assembly, the cavity comprises a floor and a plurality of walls extending from the floor.

In another example of any of the foregoing assemblies, the plurality of walls comprise a first wall, a second wall opposite the first wall, a third wall extending from the first wall to the second wall, and a fourth wall extending from the first wall to the second wall.

In another example of any of the foregoing assemblies, the electronic component is mounted to the floor.

In another example of any of the foregoing assemblies, a cover is attached to the array plate to enclose the electronic component within the cavity.

In another example of any of the foregoing assemblies, the electronic component is secured directly to the cover.

In another example of any of the foregoing assemblies, the array plate is an array endplate.

In another example of any of the foregoing assemblies, the electronic component comprises a battery electronic control module.

In another example of any of the foregoing assemblies, a first side of the array plate faces a plurality of battery cells, and the cavity is open to a second side of the array plate, the second side opposite the first side.

In another example of any of the foregoing assemblies, a heat exchanger plate is attached to the array plate.

A method according to another exemplary aspect of the present disclosure includes, among other things, housing an electronic component within a cavity of an array plate, and holding a battery cell of an array with the array plate.

In another example of the foregoing method, the method further comprises covering the cavity with cover.

In another example of any of the foregoing methods, the method further comprises securing the electronic component to the cover.

In another example of any of the foregoing methods, the method further comprises mounting the array plate on a heat exchanger plate and communicating thermal energy from the electronic component through the array plate to the heat exchanger plate.

In another example of any of the foregoing methods, the array plate is an endplate.

In another example of any of the foregoing methods, the method further comprises securing the electronic component to a floor of the cavity.

In another example of any of the foregoing methods, a first side of the array faces a plurality of battery cells, and the cavity is open to a second side of the array, the second side opposite the first side.

In another example of any of the foregoing methods, the electronic component is a battery electronic control module.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to an array plate of a battery pack for an electrified vehicle. In particular, the disclosure relates to housing an electronic module within a cavity of the array plate.

Housing the electronic module within the cavity of the array plate can reduce required packaging space and can facilitate thermal energy exchange with the electronic module.

Figure 1:
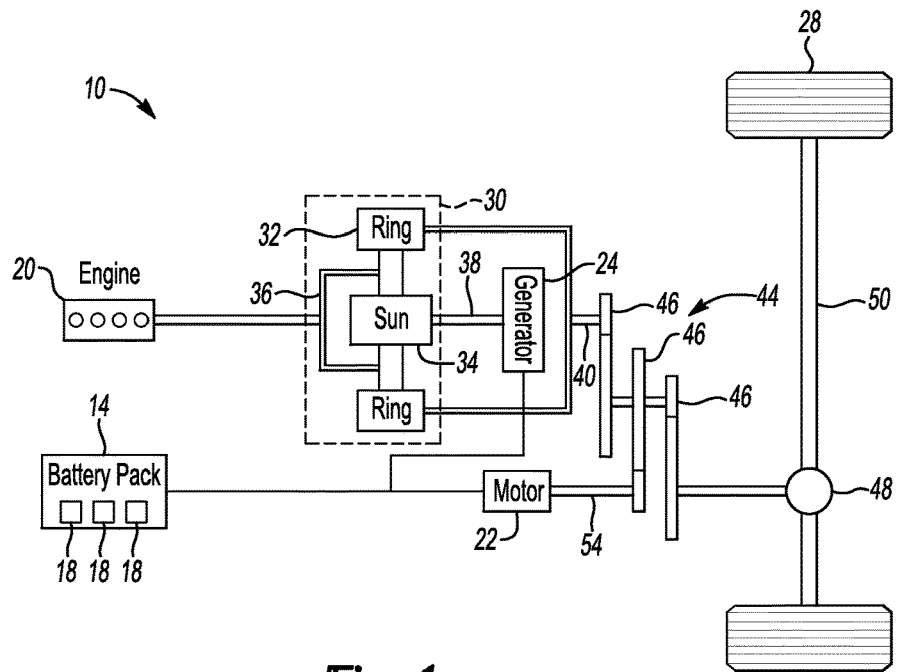
FIG. 1 illustrates a schematic view of a powertrain for an electrified vehicle.

Referring to FIG. 1, a powertrain 10 of a hybrid electric vehicle (HEV) includes a battery pack 14 having a plurality of arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

The battery pack 14 is a traction battery as the battery pack 14 provides propulsive power that is used to drive the wheels 28.

Figure 2:
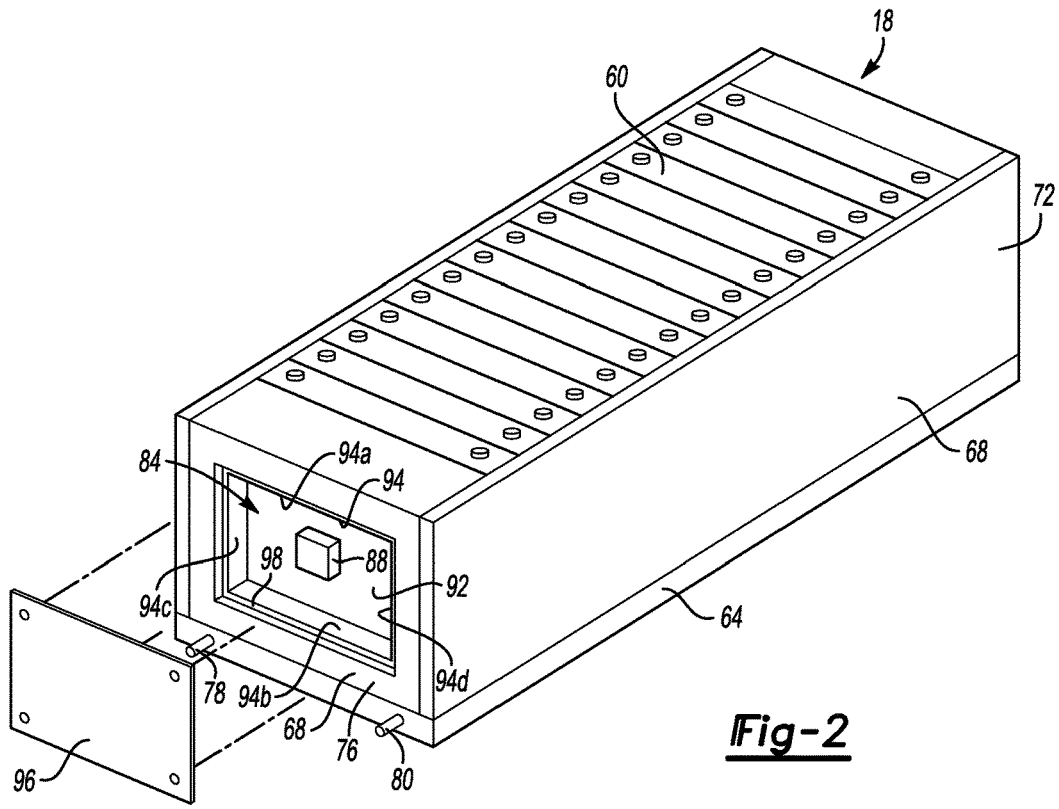
FIG. 2 illustrates a perspective, schematic view of an array from a battery pack of the powertrain of FIG. 1.
Figure 3:
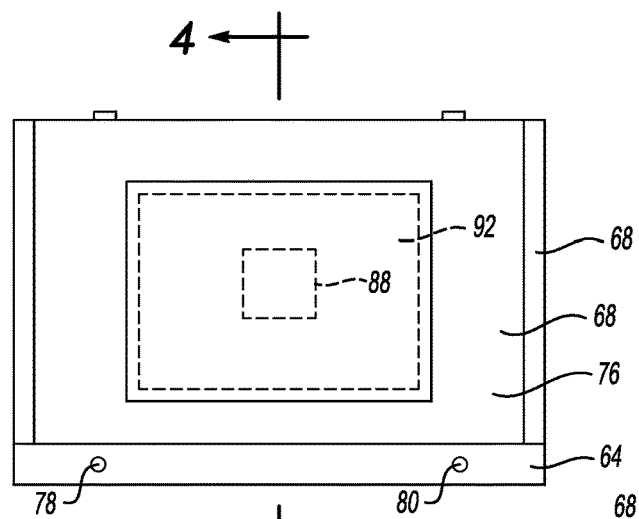
FIG. 3 illustrates an end view of the array of FIG. 2.
Figure 4:
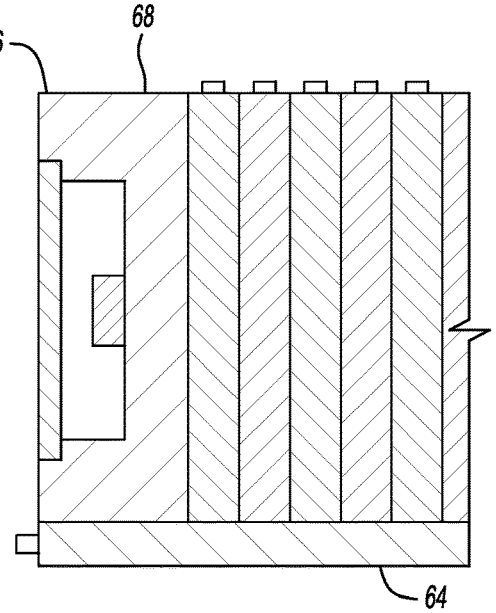
FIG. 4 illustrates a section view at line 4-4 in FIG. 3.

Referring now to FIGS. 2 to 3, each array 18 includes a plurality of battery cells 60, a heat exchanger plate 64, and array plates 68. The battery cells 60 are disposed on the heat exchanger plate 64. The array plates 68 are positioned against the sides and ends of the plurality of battery cells 60. The array plates 68 include side plates 72 and endplates 76.

The array is cooled, in this example, via liquid coolant communicated through the heat exchanger plate 64. Liquid coolant moves through an inlet 78 to a coolant path within the heat exchanger plate 64. The liquid coolant moves through the coolant path to exchange thermal energy with the cells 60, the array plates 68, and other portions of the array 18. The liquid coolant exits the coolant path at an outlet 80.

In this example, the liquid coolant is used to cool the array 18. In another example, the liquid coolant is used to heat the array 18.

Referring again to the array plates 68, at least one of the example endplates 76 includes a cavity 84. An electronic module 88 is held within the cavity 84.

The example cavity 84 includes a floor 92. Walls 94 extend from the floor 92 to provide the cavity 84. The cavity 84 is hexahedral in this example.

The example walls 94 include a first wall 94a facing a second wall 94b. The example walls 94 further include a third wall 94c facing a fourth wall 94d. The walls 94 extend perpendicularly from the floor 92.

The first wall 94a is perpendicular to the second wall 94b. The third wall 94c is perpendicular to the fourth wall 94d.

The third wall 94c extends from the first wall 94a to the second wall 94b. The fourth wall 94d extends from the first wall 94a to the second wall 94b.

Other cavities having other arrangements of walls 94 and the floor 92 are possible and fall within the scope of this disclosure. The cavity 84 could be cylindrical, for example.

A cover 96 is secured to a ledge 98 to enclose the cavity 84. The cover 96 protects the electronic module 88 housed within the cavity 84. The cover 96 can, for example, protect the electronic module 88 from humidity damage, water damage.

The cover 96 can be a metallic material, a polymer material, or some combination of these. In some examples, the cover 96 comprises metallic material to provide electromagnetic shielding of the electronic module 88.

Mechanical fasteners, not shown, could be used to secure the cover 96 to the ledge 98 of the endplate 76.

The electronic module 88 is mounted directly to the floor 92 using mechanical fasteners, an adhesive, or some other connector.

The electronic module 88 is, generally, a type of electronic component having circuitry mounted to one or more circuit boards.

The electronic module can include electronic components associated with portions of a vehicle other than the battery pack 14 (FIG. 1). The electronic module can include electronic components associated primarily with the battery pack 14.

Although the example electronic module 88 is shown as a singular electronic module. The electronic module 88 may include a plurality of individual electronic modules.

The electronic module 88, in this example, comprises a battery electronic control module (BECM) containing circuitry utilized for controlling the array 18 and other components associated with the array 18. The electronic module 88 can comprise the entire BECM, or some portion of the BECM.

Generally, the BECM can be used to measure voltage, current, and temperature. The BECM can further be used to control contactors, broadcast charge and discharge power limits, measure high voltage to chassis isolation, and correct cell imbalance.

The BECM can distribute functionality to other slave/satellite modules, such as Battery Pack Sensor Module (BPSM). The electronic module 88 can include the slave/satellite modules in some examples.

Generally, the example electronic module 88 can measure various inputs to broadcast the capability of the battery pack 14 so that the vehicle knows how much power can be drawn. The electronic module can control the state of the contactor to connect/disconnect the battery pack 14 to the vehicle bus, and can correct cell voltage imbalances within the battery pack 14 by charging or discharging individual (or grouping of) cells 60

The cavity 84 could hold other electronic modules instead or, or in addition to the BECM and the BPSM. The other electronic modules could carry out some or all of the functionality described above, or other functionality. Generally, the electronic module 88 is a contained assembly of electronic components and circuitry.

In addition to the example electronic modules 88 described above, other electronic components, such as current sensor, contactors, and precharge resistors could be mounted to the endplate 76. The current sensors could benefit from the electromagnetic compatibility shielding.

Contactors and precharge resistors could benefit from the cooling effect of the endplate 76.

The electronic module 88 can heat during operation. Because the electronic module 88 is mounted to the endplate 76, the generated thermal energy communicates from the electronic module 88 to the endplate 76.

The endplate 76 is disposed upon the heat exchanger plate 64 to facilitate thermal communication between the endplate 76 and the heat exchanger plate 64. Thus, thermal energy from the electronic module 88 can move through the endplate 76 to the heat exchanger plate 64. Coolant can then carry the thermal energy away from the array 18.

The example cavity 84 is shown within the endplate 76. In another example, the side plate 72 provides the cavity to hold the electronic module 88.

In still another example, the cavity 84 can be provided by a combination of the endplate 76 and the side plate 72.

Figure 5:
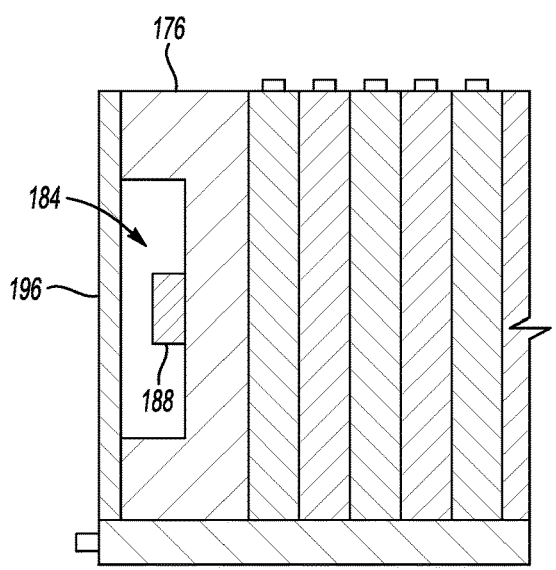
FIG. 5 illustrates a section view at the position of FIG. 4 of another example embodiment

Referring now to FIG. 5, another example endplate 176 provides a cavity 184 to hold an electronic module 188. In this example, a cover 196 is not positioned on a ledge of the endplate 176, but instead extends across an outwardly facing surface of the endplate 176 from a vertical bottom of the endplate 176 to a vertical top of the endplate 176.

Figure 6:
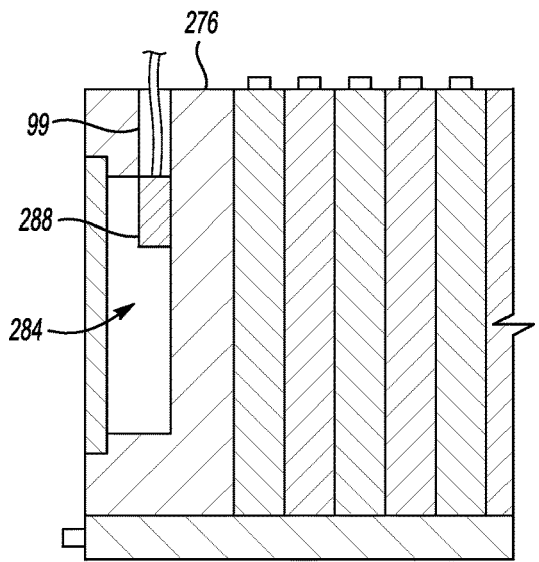
FIG. 6 illustrates a section view at the position of FIG. 4 of yet another example embodiment.

Referring now to FIG. 6, another example endplate 276 provides a bore 99 extending from a cavity 284 to an outwardly facing surface of the endplate 276. The bore 99 can be used to provide a path for connectors, such as wires, to extend from outside the cavity 284 to an electronic module 288 held within the cavity 284.

Figure 7:
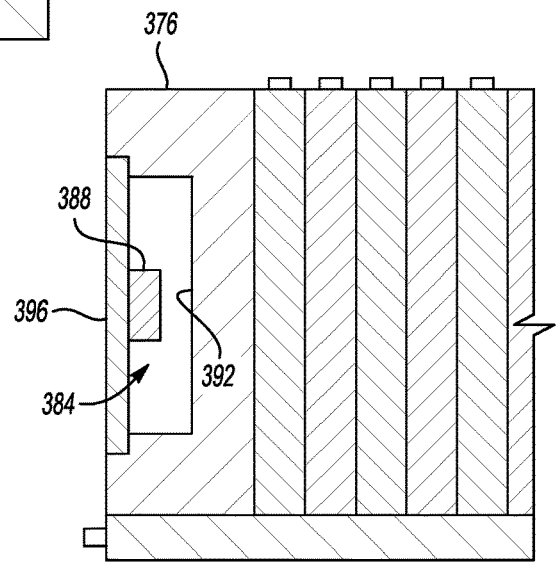
FIG. 7 illustrates a section view at the position of FIG. 4 of still another example embodiment.

Referring now to FIG. 7, another example endplate 376 provides a cavity 384 that holds an electronic module 388. In this example, the electronic module 388 is mounted to a cover 396, rather than a floor 392 of the cavity 384.

Figure 8:
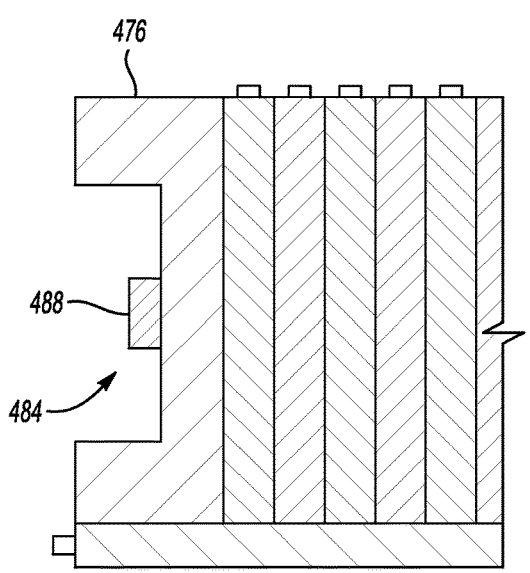
FIG. 8 illustrates a section view of at the position of FIG. 4 still another example embodiment.

Referring now to FIG. 8, another example endplate 476 provides a cavity 484 that holds an electronic module 488 and is uncovered. That is, no cover is used to enclose the electronic module 488 within the cavity 484.

The various features of the example embodiments in FIGS. 2 to 8 can be combined in other example embodiments. For example, the bore 99 of the FIG. 6 embodiment can be used in combination with the endplate 376 of the FIG. 7 embodiment, or the endplate 476 of the FIG. 8 embodiment. Additionally, the electronic module 388 secured to the cover 396 of the FIG. 7 embodiment could be instead secured to the cover of the embodiments of FIGS. 2 to 6.

The examples above could be used in connection with a battery pack that is air cooled. In such an air cooled pack, a spacer is typically placed between the endplate and the adjacent cell. Air is communicated through passageways provided by the spacer to reduce the cell temperature delta within an array, The spacer separates the additional thermal mass of the endplate having an effect on the cell temperature and presents the surface area of the cell against the air flowing through the array. In an air-cooled example, airflow moves across the inner side of the end plate allowing the endplate to transfer heat to the cooling medium.

Features of the disclosed examples include an electronic module held within a cavity of an array plate, which provides a thermal communication path between the electronic module and a heat exchanger plate. Holding the electronic module within the cavity can provide protection for the electronic module and can reduce a required packaging footprint. The cavity can be optionally covered.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. An assembly, comprising:
a plurality of battery cells;
an array plate positioned against a side of at least one of the plurality of battery cells to hold the plurality of battery cells;
an electronic component held within a cavity of the array plate; and
a cover attached directly to the array plate to enclose the electronic component within the cavity, the cover secured directly to a ledge of the array plate such that at least a portion of the cover is received within the cavity.

2. The assembly of claim 1, wherein the cavity comprises a floor and a plurality of walls extending from the floor.

3. The assembly of claim 2, wherein the plurality of walls comprises a first wall, a second wall opposite the first wall, a third wall extending from the first wall to the second wall, and a fourth wall extending from the first wall to the second wall.

4. The assembly of claim 2, wherein the electronic component is mounted to the floor.

5. The assembly of claim 1, wherein the electronic component is secured directly to the cover.

6. The assembly of claim 1, wherein the array plate is an array endplate.

7. The assembly of claim 1, wherein the electronic component comprises a battery electronic control module.

8. The assembly of claim 1, wherein a first side of the array plate faces the plurality of battery cells, and the cavity is open to a second side of the array plate, the second side opposite the first side.

9. A method, comprising:
housing an electronic component within a cavity of an array plate;
holding a plurality of battery cells of an array with the array plate, the plurality of battery cells disposed along a longitudinal axis of the array; and
covering the cavity with cover that is secured directly to the array plate; and
securing the cover to a ledge of the array plate to enclose the cavity, the ledge recessed axially from a surface of the array plate that faces away from the plurality of battery cells along the longitudinal axis of the array.

10. The method of claim 9, further comprising securing the electronic component to the cover.

11. The method of claim 9, further comprising mounting the array plate on a heat exchanger plate and communicating thermal energy from the electronic component through the array plate to the heat exchanger plate.

12. The method of claim 9, wherein the array plate is an endplate.

13. The method of claim 9, further comprising securing the electronic component to a floor of the cavity.

14. The method of claim 9, wherein a first side of the array faces a plurality of battery cells, and the cavity is open to a second side of the array, the second side opposite the first side.

15. The method of claim 9, wherein the electronic component is a battery electronic control module.

16. The assembly of claim 1, wherein the ledge is recessed axially from a surface of the array plate that faces away from the plurality of battery cells along the longitudinal axis of the array.

17. An assembly, comprising:
a plurality of battery cells disposed along a longitudinal axis of an array;
an endplate at an axial end of the array, the endplate positioned against a side of at least one of the plurality of battery cells to hold the plurality of battery cells;
an electronic component held within a cavity of the array plate; and
a cover attached directly to the array plate to enclose the electronic component within the cavity, the cover extends across an outwardly facing surface of the endplate from a vertical bottom of the endplate to a vertical top of the endplate, wherein the endplate and the cover are axially misaligned such that the endplate and the cover are not overlapping along the longitudinal axis.

\* \* \* \* \*